2,824,780
Patented Feb. 25, 1958

2,824,780

FILAMENT FORMATION FROM POLYMERIC DISPERSIONS

Cameron B. Satterthwaite, Wilmington, Del., assignor to E. I. du Pont de Nemours and Company, Wilmington, Del., a corporation of Delaware No Drawing. Application April 10, 1953
Serial No. 348,120

7 Claims. (Cl. 18—54)

This invention relates to a process for the preparation of funicular structures from synthetic polymers. More particularly, it pertains to a new process for the preparation of fibers and filaments from discrete particles of these polymers dispersed in organic liquids.

Three processes for the manufacture of filamentary materials or fibers are well known to the art. These three processes are generally referred to as wet spinning, dry spinning and melt spinning. In each of these processes the basic method is the same. This comprises converting the solid polymer to a fluid state, extruding through an orifice and thereafter converting the polymer to a solid possessing the desired shape. In the wet and dry spinning processes this fluid state is achieved by dissolving the polymer in a suitable solvent. In the melt spinning process the polymer is melted by heating it to a temperature above its melting point.

Although all of these processes are extensively used commercially, each is subject to serious limitations. For example, it is generally necessary to isolate and purify the polymer before it can be dissolved or melted to prepare the filament or fiber. These intermediate steps generally result in a substantial increase in the cost of the final product. Another serious drawback is the high temperature generally involved in the preparation of solutions and melts for spinning. This frequently leads to degradation of the polymers with an accompanying loss of desirable properties. This prohibits the use of certain polymers with otherwise desirable properties for fibers and filaments. Even when it is possible to convert a polymer into filamentary products by the known processes, considerable care during manufacture is frequently necessary in order to obtain a desirable product. These precautions also increase the cost of the product.

The best solvents for a given polymer frequently are expensive. If less expensive but poorer solvents are used, it is generally necessary to resort to rather high temperatures in order to obtain a polymer concentration which is practical for spinning. Also, it is frequently necessary to use elevated temperatures in order to reduce the viscosity to the spinnable range. Where organic solvents are used, which is generally the case for synthetic polymers, high temperatures introduce toxicity and explosion hazards. This requires either the use of a closed system or expensive solvent recovery and fume removal equipment.

It is evident from the foregoing discussion that a method for preparing funicular structures which would eliminate the necessity for dissolving or melting the polymer prior to spinning would be highly desirable. Such a method would be particularly attractive if it could be applied to a wide variety of polymers. A method for preparing fibers and filaments which would eliminate the usual steps of isolating and purifying the polymer prior to dissolving or melting would also be very desirable.

Accordingly, it is an object of this invention to provide a process for the preparation of fibers and filaments without applying the usual solution and melt techniques. Another object is the provision of a process for using discrete particles of polymer dispersed in a liquid for the production of funicular structures. It is a further object to provide a new process for preparing fibers and filaments from polymers without isolating, purifying and dissolving or melting the polymer.

The objects of this invention are accomplished by dispersing the polymer in the form of discrete particles in a suitable liquid and extruding this dispersion through an orifice into a heated zone where the polymer coalesces to form a funicular article. The polymer is dispersed in a liquid medium which has substantially no solvent action on the polymer at room temperature but which is capable at elevated temperatures of coalescing the polymer particles. The dispersion, which may contain up to 70% polymer, is shaped by extruding through an orifice. The resultant funicular structure, which still contains some liquid, but is self-supporting, is then coalesced, for example, by passing it through a heated zone. The structure is then cooled to produce a solid continuous fiber or filament. The textile filaments, fibers and threads produced by this process may then be subjected to suitable after-treatments, which will be described later.

In the following examples, which are given for illustrative purposes only and are not limitative, the parts are by weight and all processes were carried out at room temperature (about 25° C.) unless otherwise stated.

Example I

A dispersion was prepared by mixing "Geon 121" (a polyvinyl chloride resin) with "Flexol DOP" (a dioctyl phthalate). A smooth paste was obtained which contained 60% polyvinyl chloride. This paste was extruded through a shaped orifice and then passed through a ¼ inch air gap into a bath of silicone oil heated to 175° C. The filament coalesced in the bath. The fiber was extracted with acetone, and the fibers were drawn four times their original length over a pin heated to 100° C. The final fibers had a tenacity of 1.5 grams per denier and an elongation of 50%.

Example II 200 parts of aqueous polyacrylonitrile dispersion containing 40% polymer was mixed with 100 parts of adiponitrile. To this mixture was added 15 parts of N,N-dimethyl formamide as a transfer agent. After the water had been removed, the resulting mixture in which the polymer was dispersed was extruded from a spinneret through a 2 inch air gap into an oil bath heated to 180° The coalesced filament was drawn to 16 times its original length over a roll heated to 140° C. It was then washed in acetone and water. After drying, the filament had a tenacity of 4.80 grams per denier and an elongation of 18.8%.

Example III 58 parts of an aqueous polyacrylonitrile dispersion containing 40% polymer was added with stirring to 25 parts of adiponitrile. Continuous, vigorous stirring produced an emulsion to which was added 5 parts of potassium chloride. This deactivated the wetting agent and caused the polymer to transfer from the water to the adiponitrile. The water layer was withdrawn and the polymer paste was stirred while heated to 70° C. under vacuum to remove the remaining water. Analysis of a portion of the resultant paste by acetone extraction showed the solids content to be 43.5%.

The dispersion was extruded from a spinneret through a tube furnace heated to 260° C. A coalesced monofilament was obtained which could be oriented by stretching.

Example IV 100 parts of an aqueous dispersion of polyvinyl fluoride was stirred thoroughly with 30 parts of adiponitrile. Approximately 1 part of 5 N sulfuric acid was added to this creamy emulsion. The polyvinyl fluoride transferred to the adiponitrile phase and the two phases separated. The water phase was removed and the polymer/adiponitrile mixture was washed with water and dried. The dried emulsion contained 51.7% polyvinyl fluoride. It was extruded through a spinneret into an oil bath heated to 150° C. The coalesced filament was wound up on a bobbin at low speeds.

Example V 200 parts of an aqueous dispersion of polyacrylonitrile was mixed with 140 parts of adiponitrile. 2 parts of 5 N sulfuric acid was added to transfer the polyacrylonitrile to the adiponitrile phase. After washing and drying, the dispersion was milled on a 3-roll ink mill to improve the homogeneity of the paste. This paste was extruded through a spinneret into a stream of oil heated to 185° C. which flowed co-currently with the filament. The coalesced filament was wound up on a bobbin at 400 feet per minute.

Example VI

A dispersion was prepared as described in Example V, using 100 parts of aqueous polyacrylonitrile dispersion, 70 parts of adiponitrile and 3 parts of 5 N sulfuric acid. After washing and drying, the resultant dispersion was extruded through a monofil spinneret into a zone filled with vapor from boiling ethylene glycol. The coalesced filament was collected on a bobbin.

Example VII 32 parts of an aqueous dispersion of N-methoxymethyl polyhexamethylene adipamide was mixed with 20 parts of "Hercoflex 900" (a reaction product of 1 mol of phthalic anhydride, 2 mols of benzoic acid and 2 mols of triethylene glycol). The polymer transferred readily from the water to the "Hercoflex." After thorough drying, the paste was extruded into an oil bath heated to 135° C. Coalesced filaments were obtained which could be oriented by stretching. Cyclohexanone or diacetone alcohol could be substituted for the "Hercoflex" as dispersion media.

Example VIII 400 parts of aqueous polyacrylonitrile dispersion containing 40% polymer was mixed with 280 parts of adiponitrile. The transfer of the polymer from the aqueous phase to the plasticizer was accomplished without a transferring agent by severe agitation in a Waring Blendor. The resulting dispersion was extruded from a 5-hole spinneret into a flowing oil bath at a temperature of 190° C. The fine filaments were wound up at 20 yards per minute. The coalesced fibers were drawn 14 times over a roll at 175° C. and after extracting the plasticizer in acetone and relaxing in boiling water, the fibers had the following properties: tenacity, 5.4 grams per denier; elongation, 18%; denier, 4.9.

Example IX 5.5 parts of polyethylene terephthalate was dissolved in 49 parts of "fomal" (58.8% phenol, 41.2% trichlorophenol) by mixing and heating. 75 parts of dioxane was added to the solution. This caused the polymer to precipitate in finely divided form. The polymer was filtered from the liquid and was washed several times with methanol. 4 parts of the resulting powdered polymer was dispersed in 10 parts of meta-cresol to form a gummy paste. The paste was extruded as described in Example III into an oil bath at 120° C. Short lengths of fiber were obtained which were quite plastic. After extracting the plasticizer in boiling water the fibers could be oriented by drawing 4 times their original length at room temperature. The drawn fibers had a tenacity of 2.6 grams per denier and an elongation of 27%.

Example X 50 parts of an aqueous dispersion of polyacrylonitrile containing 40% polymer were mixed with 31 parts of propylene carbonate. Phase transfer was accomplished by vigorous agitation in a Waring Blendor. The resulting dispersion was dried and diluted with propylene carbonate to give a dispersion containing 35% polyacrylonitrile. The dispersion was extruded from a spinneret through a 2 inch air gap into an oil bath heated to 130° C. The coalesced filament was drawn 16 times at 160° C. and washed in boiling water. After drying, the filament had the following properties: tenacity, 3.94 grams per denier; elongation, 12.8%; initial modulus, 66.9 grams per denier and denier, 12.6.

Example XI

Finely divided polyacrylonitrile was heated at 125° C. for one-half hour to reduce the solubility. 40 parts of the dried polymer was stirred with 60 parts of N,N-dimethylacetamide to form a slurry. The freshly formed dispersion was extruded from a spinneret through a 2 inch air gap into an oil bath heated to 100° C. A coalesced filament was obtained.

Example XII

An aqueous dispersion containing 35% by weight of a 90/10 copolymer of acrylonitrile and methyl acrylate was prepared by the usual emulsion polymerization technique. To 200 parts of this dispersion were added 140 parts of adiponitrile and approximately 2 parts of 5 normal sulfuric acid as a transfer agent. On mixing, the copolymer transferred from the aqueous phase to the adiponitrile phase. The dispersion of the copolymer in adiponitrile was separated, washed with water and dried. It was then extruded through a spinneret into an oil bath heated to 175° C. The coalesced filament was collected on a bobbin.

Copolymers of acrylonitrile with vinyl pyridine, vinyl chloride, vinylidene chloride, methyl methacrylate, methacrylonitrile and other copolymerizable vinyl compounds may be substituted for the acrylonitrile/methyl acrylate copolymer in the above example by choosing the proper dispersing medium for the particular composition being used.

As can be seen from the examples above, the process of this invention involves the preparation of dispersions containing polymer particles of such size that permit their extrusion through the spinneret orifices. For this, the pastes should contain substantially no particles having diameters larger than the orifice and preferably they should be less than one-half the smallest dimension of any orifice, that is the web of the spinneret. This is a very important factor in the preparation of textile denier fibers by this process. Generally, undesirably large particles are not present and do not form prior to extrusion, but if they are present, they can be removed by filtration.

The above examples illustrate the application of this invention to many polymers and dispersing media and a variety of conditions is shown. Many other polymers may be processed as shown above or within the conditions set forth herein. However, the process of this invention is restricted to wholly synthetic polymers and is not intended to include derivatives of natural polymers. For example, the following specific polymers and classes of polymers are illustrative of those which may be used in the process: acrylonitrile polymers; copolymers of acrylonitrile with mono- and diethylenically unsaturated monomers such as the vinyl pyridines and those disclosed in such patents as U. S. 2,404,714 to 2,404,727; polyacrylic and polymethacrylic esters, such as polymethylmethacrylate; vinylidene chloride polymers; polyethylene; polyvinyl acetate; polymethylvinyl ketone; polyvinyl ethers, such as polymethylvinyl ether; polyvinyl carbazole;

polyvinylacetals; polyvinyl chloride and interpolymers of vinyl chloride with vinyl esters, acrylonitrile, vinylidene chloride and the like; polyvinyl fluoride; partially hydrolyzed polyvinyl esters; polyamides, such as polyhexamethylene adipamide, N-methoxymethyl polyhexamethylene adipamide, polyethylene sebacamide, polymethylene bis-(para-cyclohexylene) adipamide; formaldehyde polymers; polyureas such as polytetramethylene urea; polyurethanes; polyesters, polyesteramides, polysulfonamides; and many others. Coalescible copolymers of the above classes of homopolymers may also be used in this process. Of course, the process can be employed to convert a mixture of polymers into a funicular structure from a single dispersion.

Thus, a wide variety of polymers may be used in this process. Polymers best suited to the process are those that are easily converted to spherical particles small in size, but capable of being converted to particles having reasonably wide particle size distribution and the particles should have sufficient resistance to solvent penetration to prevent softening at room temperature. However, the process is not limited to polymers possessing all of these desirable features. One obvious requirement is that the polymers have a molecular weight in the fiber-forming range. It is generally recognized that polymers having a molecular weight above 5,000 and preferably above 8,000 are suitable for the preparation of fibers and filaments.

Liquids particularly suitable for use as dispersion media are those which do not exert any appreciable solvent action on the polymer at room temperature but which are capable of coalescing the polymer particles. Generally these liquids are plasticizers or organic liquids which would be classified as poor solvents or "fringe" solvents for the polymer. Liquids in which the polymers are appreciably soluble at room temperature may be used, but it is necessary to reduce the solvent activity, for example, by the addition of a non-solvent liquid or by heat-hardening the polymer particles. Suitable liquids or mixtures of liquids may soften the surface of the polymer particles slightly at room temperature, but they do not penetrate into the interior of the particles. This is evident from the fact that dispersed particles of polymers which are normally crystalline in the isolated state still show a sharp X-ray diffraction pattern. Appreciable solvent penetration would be expected to produce a diffuse pattern. The initial softening effect at room temperature is negligible in most instances. Physical tests show that no swelling occurs in the pastes; that this is so is important for the paritcle size is not altered or subject to change prior to extrusion.

In general, suitable liquids will possess some or all of the following characteristics: low volatility, freedom from odors, colors, etc., low room temperature coalescing activity and adequate solvent activity at the desired temperature. Choice of the proper dispersing agents will, of course, be dependent upon the particular polymer which is being dispersed and shaped. To illustrate the types of liquids which may be used, the following examples are given for specific polymers. These examples are not considered to be exhaustive or to limit the invention in any way.

The following are examples of organic liquids which may be used as dispersing media for acrylonitrile polymers. Poor solvents, such as acetic anhydride, beta, beta'-dicyanoethyl ether, adiponitrile, propylene carbonate and gamma-valerolactone, may be used without dilution. Of these, adiponitrile and propylene carbonate are preferred dispersing media for polyacrylonitrile and its copolymers having a major acrylonitrile content. Good solvents for acrylonitrile polymers, such as N,N-dimethyl formamide, tetramethylene sulfone and gamma-butyrolacetone may also be used. In some cases it may be necessary to reduce the solvent activity by adding such non-solvents as toluene, heptane, xylene or mesitylene. Water-soluble acrylonitrile polymer solvents, such as N,N-dimethyl formamide, gamma-butyrolacetone and tetramethylene sulfone, may be used to prepare dispersions by the phase transfer method by adding water-insoluble diluents such as nitrobenzene, "Primol D" (mineral oil), tetralin, trichlorobenzene or di-(2-ethylhexyl) phthalate. By the use of these and other dispersing media, smooth dispersions containing up to 60% by weight of acrylonitrile homopolymers and copolymers may be readily prepared. Of the acrylonitrile polymers, acrylonitrile homopolymers and copolymers which contain at least 85% acrylonitrile are of particular interest in this process. Acrylonitrile polymer dispersions should preferably contain from 30% to 45% polymer, although dispersions containing from 20% to 60% polymer may be used. These dispersions may be readily extruded to form fibers and filaments.

Suitable latent coalescing agents for preparing polyvinyl fluoride dispersions include the following: N,N-dimethyl formamide, N,N-dimethyl acetamide, cyclohexanone, acetophenone, tetramethyl urea, cyclic ethylene carbonates, camphor, nitrobenzene, phenol, isophorone among others. In this case also, solvent activity may be reduced if desired by heat-hardening or by the addition of such non-solvents as aliphatic hydrocarbons, chloroform, acetic acid and ethanol.

Dispersions of polyamides may also be used in this process. As is true of all of the polymers, the choice of a particular dispersion medium will depend upon the solubility of the particular polymer used. The following are examples of representative liquids which may be used for certain polyamides: high boiling alcohols and glycols, such as tetrahydrofurfuryl alcohol, phenyl ethyl alcohol, fenchyl alcohol, ethylene glycol, propylene glycol and 2,3-dihydroxypropane; amino alcohols, such as diethanolamine and triethanolamine; hydroxynitriles, such as beta-hydroxypropionitrile; amides, such as N,N-dimethyl formamide and N,N-dimethyl methoxyacetamide; halohydrins, such as ethylene bromhydrin and trimethylene chlorohydrin; acid anhydrides, such as propionic anhydride; dinitriles, such as adiponitrile; aromatic nitro compounds, such as nitrobenzene; and high boiling amines, such as aniline. Once again, it is possible to use more active coalescing agents in combination with non-solvents.

It has been observed that polymer particles can be coalesced satisfactorily even when crystalliinity (as measured by X-ray diffractions) persists throughout the entire process. From this it may be inferred that the cores of the particles may remain crystalline while only the surfaces become viscous and flow together. The depth of surface which must be softened before coalescence can occur is not known. The viscosity of polymer particle surfaces and the forces of interaction between polymer particles are quantities which are extremely difficult to measure and at present only qualitative and theoretical measurements have been made. For the purposes of this invention, a liquid medium may be used as a coalescing agent if it swells a polymer as much as the following polymers are swollen under the specified conditions: (1) polyvinyl chloride suspended in di-2-ethylhexyl phthalate heated to 150° C., (2) polyacrylonitrile suspended in propylene carbonate heated to 100° C. or in adiponitrile heated to 160° C., (3) polyvinyl fluoride suspended in adiponitrile heated to 130° C., or (4) N-methoxymethyl polyhexamethylene adipamide suspended in "Hercoflex 900" at 80° C.

Two principal methods may be used for preparing the dispersions used for spinning fibers and filaments. One is to mix dry polymer powder with a suitable liquid medium. The other is a phase transfer method known as "flushing" in which dispersed particles are transferred from water to a non-aqueous medium. The latter method is preferred whenever it can be applied; it is particularly valuable for vinyl type polymers which are generally prepared by emulsion polymerization techniques to give aqueous dispersions of the polymer. These processes are described in more detail below.

When dispersions are to be prepared using dry polymer powder, the polymer is isolated in suitable form, then dried and usually pulverized. The size of the polymer particles may be reduced by a variety of means known in the art, such as ball milling or grinding. A convenient method for reducing the particle size is to pass it through a "Micronizer" or "Mikroatomizer" which subjects the polymer particles to a high velocity rotating motion in a confined chamber which causes the agglomerates to subdivide.

The powder is then mixed with the liquid dispersing medium in any suitable mixing equipment. One difficulty frequently encountered with this method for preparing dispersions is the tendency for the polymer particles to agglomerate. This results in the formation of a lumpy paste which does not extrude smoothly. This difficulty can usually be overcome by milling the paste on roller mills. Inhomogeneities are thus broken up and a much smoother and more readily extrudable paste is obtained.

In the present process, the phase transfer technique is used to transfer polymer particles from an aqueous medium to a non-aqueous medium. The method is particularly valuable for those polymers which can be prepared by the emulsion polymerization technique.

In preparing dispersions by this method, the aqueous dispersion of the polymer is mixed with a water-insoluble liquid which is to accomplish the coalescence later. This liquid, which is the swelling agent for the polymer, must be active enough to wet the polymer and cause transfer of the particle from water to itself. This transfer of polymer from the aqueous phase can be facilitated by the addition of an electrolyte which renders inactive the surface-active agent used to disperse the polymer in water. Any electrolyte which will break the emulsion may be used, but it is preferred to use a liquid electrolyte, such as dilute sulfuric acid, or organic, water-soluble liquids, such as acetone, alcohol, N,N-dimethylformamide, etc., because these materials do not form crystals which would interfere in spinning.

Once the emulsion is broken the polymer transfers spontaneously from the aqueous layer to the organic dispersing medium. The dispersion is then washed with water to remove electrolytes. The water layer is then separated and the dispersion is dried. After drying, the dispersion, containing the initially present discrete polymer particles in substantially their initial form, is ready for use. Low concentrations, for example, 5%, of water in the dispersion can generally be tolerated, although it is preferred that the dispersion be substantially free of water.

Emulsion polymerization techniques generally produce polymers having the proper particle size for the preparation of the dispersions used in this invention. However, if it is necessary or desired that the particle size be reduced, the reduction may be accomplished after the dispersion has been prepared. For example, just prior to spinning the dispersion may be ball milled or given other suitable milling treatments. Even though the phase transfer method is generally better than the powder method for producing homogeneous blends, lumpy pastes containing polymer aggregates are sometimes obtained. These aggregates may be broken up by milling on a 3-roll ink mill or similar equipment to produce a smooth paste.

Properly prepared dispersions are generally smooth flowable pastes; however, dispersions which are more fluid than pastes may be used. The viscosity of the paste is substantially independent of the molecular weight of the polymer. This is an important feature of this invention, since it permits the preparation of fibers and filaments from polymers having molecular weights much higher than can be utilized in prior art processes and, at the same time, the lower molecular weight polymers are readily processed to advantage. For example, polymers having molecular weights in the range of 150,000 to 2,000,000 which would be unspinnable by normal techniques, can be spun by this method.

The various dispersions may contain 20% to 70% polymer, by weight; it is preferred that they contain from 25% to 60% polymer. Fibers and filaments may be prepared from dispersions which contain polymer particles up to 30 microns in diameter; it is preferred that the diameter of the polymer particles be below 20 microns. Particles 0.005 micron in size may be employed; usually the size is 0.05 to 5 microns. The particles in a given dispersion need not be uniform in size. In fact, it is preferred to use a dispersion having a relatively wide range of particle size. However, the means of preparing dispersions usually lead to a fairly narrow size range and dispersions having such ranges in particle size perform well in the process of this invention.

The dispersions used herein are generally dispersions of colloidal size polymer particles in plasticizers having low volatility. However, the present invention is not limited to these, for, as previously indicated, the dispersions useful in this invention are not limited to those which contain colloidal-size particles and they are not limited to plasticizers or liquid dispersion media of low volatility. The dispersions used herein may contain small amounts of volatile diluents which are also useful in the process. While some of the more volatile organic liquids may be used in the process, it is preferred to use liquids of low volatility. Most of the boiling points of the materials used as dispersing media are in the range of about 130° C. to about 325° C.

The dispersions of this invention are converted into funicular articles by extruding through a suitable orifice into a heated zone where the polymer coalesces. Any of a number of methods may be used for carrying out this operation. The best method in a given instance will, of course, depend upon the particular combination of polymer and dispersing medium being used. Some of the possible methods which may be used for coalescing filaments are discussed below.

Coalescence may be achieved by extruding the paste filaments through a tube furnace and heating with radiant heat. Alternatively, the paste filaments may be permitted to fall by gravity through a zone where they are heated by radiant heat such as may be supplied by infra-red lamps. It is also possible to coalesce the paste fibers by passing it through a hot vapor bath where the filaments are heated by condensation of the vapor.

As described previously, the preferred method is to extrude the cold paste into a hot liquid coalescing bath. All of the methods described have the advantage that the polymer is heated for very short periods of time. This practically eliminates thermal degradation of the polymer. The liquid coalescing bath has the further advantage that the liquid serves to support the weak, freshly extruded paste filament. It is important to note here that, although the freshly formed filaments are relatively weak, this invention provides a process for forming filaments and fibers from dispersions of discrete polymer particles without the aid of mechanical supports for the freshly extruded funicular structures.

The liquid or mixtures of liquids which are used in the coalescing bath should preferably be non-solvents for the medium in which the polymer is dispersed. It is, however, possible to use a liquid coalescing bath which is a solvent for the dispersing medium if the bath is saturated with the dispersing medium. The coalescing bath and dispersing medium can be the same if the liquid is not too active a solvent for the polymer. It is evident that the coalescing bath should not dissolve the polymer appreciably at the temperature of the bath. Plasticized filaments and fibers are generally obtained regardless of the coalescence technique employed. The plasticizer is subsequently removed by extraction, evaporation or washing or a combination of such removal techniques.

The paste dispersions used in this invention are generally stable indefinitely and can be stored before using, if necessary. Occasionally, a particular paste may tend to gel but the time factor involved permits extrusion prior to gelation so that no difficulty is involved. Extrusion is usually at room temperature, although the dispersions may be used hot if desired provided, of course, no substantial coalescence occurs prior to extrusion. The zone in which coalescence occurs may be a liquid bath, a heated air or similar vapor gap, a furnace, or similar media or combinations thereof. The extruded material is set or fixed in the form of a funicular structure and some coalescing, either by shear or by heat effects, occurs either along with the setting or thereafter, substantially all of the coalescing occurring shortly after extrusion. Coalescing temperatures vary, being dependent upon the activity of the agent. Usually temperatures of about 90° C. to about 400° C. are used, although lower and higher temperatures can be employed. The time involved in coalescence is generally very short being of the order of 0.1 to 10 seconds. The given conditions will vary somewhat with the polymer, the dispersing media, the coalescing agent, the denier of the filaments and similar factors.

In the present invention the spinning of filaments is preferably carried out using a flowing bath in which the current is in the direction of the filament travel. This can be done by using flumes, inclined troughs or spinning tubes such as described in Millhiser U. S. Patent No. 2,440,057 or Drish et al. U. S. Patent No. 2,511,699. In this way the filaments are supported before and during coalescence and carried by the current of the bath, requiring the filaments themselves to bear only very slight tension. It is thus possible to increase materially the rate of spinning without substantial sacrifice in continuity or in the desirable properties of the yarn produced.

After the polymer has been coalesced, the funicular article is washed to remove the dispersing medium. Small quantities of the dispersing medium can be tolerated in the finished article, but it is preferred that substantially all of this liquid be removed. The fibers and filaments are washed with a liquid which is a solvent for the dispersing medium. For practical reasons it is preferred to use water for washing whenever possible. If solvents other than water are used, the shaped article is subsequently washed with water to remove the wash liquid unless this liquid is sufficiently volatile to evaporate readily on heating.

This washing operation may be carried out in a variety of ways. The continuous funicular structure may be removed from the coalescing bath and deposited in a bath of wash liquid by means of a transfer roll or it may be pulled from one bath to the other over a weir. It is also possible to wind up filaments and fibers on a suitable package such as a bobbin and wash them while wound on this package.

When filaments and fibers are prepared by this process, they may also be subjected to other suitable after-treatments such as drawing or stretching. The filaments can be drawn and oriented either before or after extraction of the dispersing medium. It is possible to carry out a part of the drawing operation before removal of the dispersing medium and to complete the drawing operation after washing and/or drying. In some cases, it is possible to orient the fibers by snubbing in the coalescing bath and drawing. The heat required for drawing is thus supplied by the coalescing bath and the spinning and drawing operations are combined into a single operation. Drawing before washing has the advantage that it permits this operation to be carried out at a lower temperature. In the preparation of polyacrylonitrile fibers, it is preferred that at least part of the drawing be done before washing since the completely undrawn extracted fiber is rather brittle.

By this invention the difficulties of fabrication from solutions of high molecular weight polymers are avoided. For example, the gelation, balling up and chemical degradation which result from heating polymer-solvent mixtures to produce solutions are eliminated. Flowable dispersions can be prepared which contain relatively high concentrations of high molecular weight polymer. Thus, the dispersions can be, and preferably are, quite concentrated with respect to the amount of polymer present. In addition, the process of this invention can be used successfully with polymers that have molecular weights so high that ordinary solution spinning techniques are inapplicable. Furthermore, the temperature employed in most of the steps of this invention are low, in the vicinity of room temperature, and since the exposure to high temperatures in the other steps of the process is very brief, the products are not discolored during formation and are essentially white. The finished products possess the high strength, flexibility and toughness required for fiber and filament applications.

A further advantage of the process is that isolation of polymer, when it is prepared as an aqueous dispersion, is not required when the phase transfer method is used. Since organic vinyl-type polymers of high quality are usually best prepared in aqueous dispersions, fabrication processes operable directly on the dispersion without isolation and dissolving of the polymer are particularly attractive economically. In addition, the relatively low viscosity of high solids dispersions compared with high viscosity solutions and the ability to handle difficultly soluble polymers of unusually good properties are distinct advantages.

The process of this invention presents a valuable tool to those interested in making textile fibers. Such fibers have a large number of requirements placed upon them, as compared to other shaped articles, such as films, and each of these many requirements must be met before a particular fiber can be used commercially, as for example, in the clothing industry. Many synthetic polymers which inherently have the properties to meet the criteria are high molecular weight, high melting polymers and because of these properties they have heretofore been unprocessable by ordinary spinning procedures, such as wet, dry or melt spinning techniques. However, these polymers can be processed in accordance with this invention, as shown above, and this fact makes the tool provided in this application of high value in the manufacture of textile fibers.

Any departure from the above description which conforms to the present invention is intended to be included within the scope of the claims.

I claim:

1. The process of preparing fibers from a synthetic fiber-forming polymer which comprises forming a smooth flowable paste by mixing the said polymer in the finely-divided state with a liquid vehicle of low volatility which is a poor solvent for the polymer at room temperature but has sufficient solvent power for the polymer at a temperature between 80° C. and 400° C. to coalesce the polymer, extruding the said paste through a spinneret while the polymer particles are in their particulate state to form a funicular structure, coalescing the polymer particles in the presence of the said vehicle by increasing the temperature thereof until the polymer loses its particulate state.

2. The process of claim 1 in which the average particle size of the polymer in the paste is from about 0.005 to about 30 microns in diameter.

3. The process of claim 1 in which the said paste contains from about 20% to 70% by weight of the polymer.

4. The process of claim 1 in which the coalescing temperature is between 90° C. and 400° C.

5. The process of claim 1 which includes removing the said organic vehicle from the polymer by washing the fibers.

6. The process of claim 1 which includes stretching the fibers.

7. The process of claim 1 in which the molecular weight of the polymer is above about 8000.

References Cited in the file of this patent

UNITED STATES PATENTS 2,644,802    Lontz _____ July 7, 1953